(12) United States Patent
Lipo

(10) Patent No.: US 8,450,963 B2
(45) Date of Patent: May 28, 2013

(54) BRUSHLESS SYNCHRONOUS MACHINE UTILIZING THIRD HARMONIC EXCITATION

(75) Inventor: Thomas A. Lipo, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 417 days.

(21) Appl. No.: 12/901,634

(22) Filed: Oct. 11, 2010

(65) Prior Publication Data

US 2012/0086381 A1    Apr. 12, 2012

(51) Int. Cl.
*H02P 6/00* (2006.01)
*H02P 6/10* (2006.01)
*H02K 29/03* (2006.01)

(52) U.S. Cl.
USPC . 318/700; 318/718; 318/400.01; 318/400.23; 310/180; 310/134

(58) Field of Classification Search
USPC ............... 318/700, 712, 719–721, 523, 771, 318/809, 400.01, 400.14, 400.23–400.26, 318/400.34, 400.36, 715, 718; 310/179–185, 310/188, 134–144
See application file for complete search history.

(56) References Cited

U.S. PATENT DOCUMENTS

| | | | | |
|---|---|---|---|---|
| 4,023,083 A * | 5/1977 | Plunkett | | 318/802 |
| 4,137,489 A * | 1/1979 | Lipo | | 318/798 |
| 4,445,080 A * | 4/1984 | Curtiss | | 318/798 |
| 4,912,378 A * | 3/1990 | Vukosavic | | 318/400.04 |
| 5,334,923 A * | 8/1994 | Lorenz et al. | | 318/805 |
| 5,376,851 A | 12/1994 | Lipo et al. | | |
| 5,422,570 A * | 6/1995 | Moreira | | 324/177 |
| 5,473,240 A * | 12/1995 | Moreira | | 318/801 |
| 5,510,689 A * | 4/1996 | Lipo et al. | | 318/809 |
| 5,672,925 A | 9/1997 | Lipo et al. | | |
| 6,831,440 B1 * | 12/2004 | Royak et al. | | 318/727 |
| 7,106,024 B2 * | 9/2006 | Harbaugh et al. | | 318/809 |
| 7,737,651 B2 * | 6/2010 | De Four | | 318/400.32 |
| 7,876,063 B2 * | 1/2011 | Fukushige | | 318/629 |
| 8,319,464 B2 * | 11/2012 | Hsu | | 318/400.41 |
| 2003/0085627 A1 | 5/2003 | Lipo et al. | | |
| 2006/0290316 A1 | 12/2006 | Seguchi et al. | | |
| 2010/0148712 A1 | 6/2010 | Klatt | | |

* cited by examiner

*Primary Examiner* — Eduardo Colon Santana
(74) *Attorney, Agent, or Firm* — Bell & Manning, LLC

(57) ABSTRACT

A brushless, synchronous machine is provided. A brushless, synchronous motor includes a rotor, a stator extending around at least a portion of the rotor and separated from the rotor by an air gap, a first stator winding, a second stator winding, a third stator winding, a drive circuit, a first rotor winding, a second rotor winding, and a diode bridge. The first stator winding, the second stator winding, and the third stator winding are mounted to the stator to generate square waves. The drive circuit is configured to provide a current to the first stator winding, the second stator winding, and the third stator winding, wherein the current includes an alternating current (AC) component and a direct current (DC) component. The first rotor winding is mounted to the rotor to form a plurality of third harmonic coils. The second rotor winding is mounted to the rotor. The generated square waves induce a voltage in the first rotor winding that is applied to the second rotor winding to create a brushless, synchronous motor. The diode bridge is mounted to the rotor to rectify the voltage induced in the first rotor winding and to apply the resulting DC voltage to the second rotor winding.

18 Claims, 10 Drawing Sheets

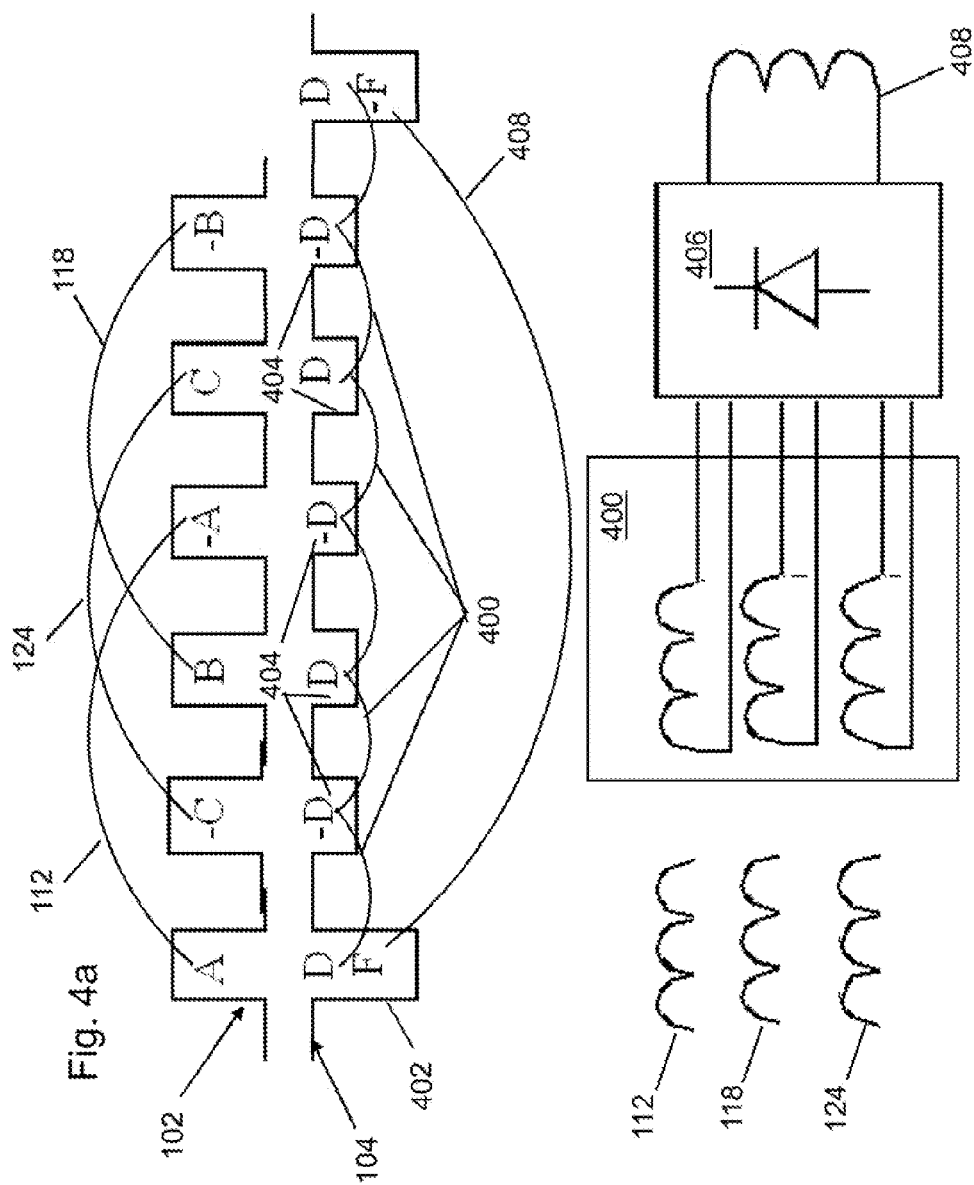

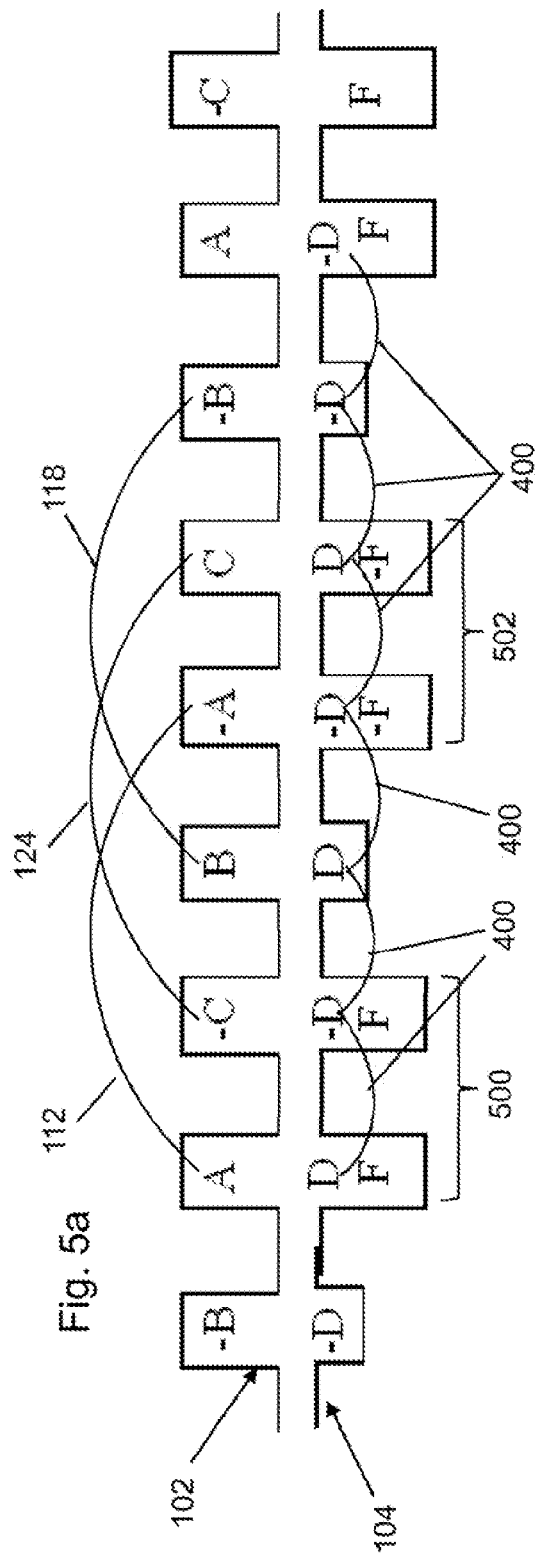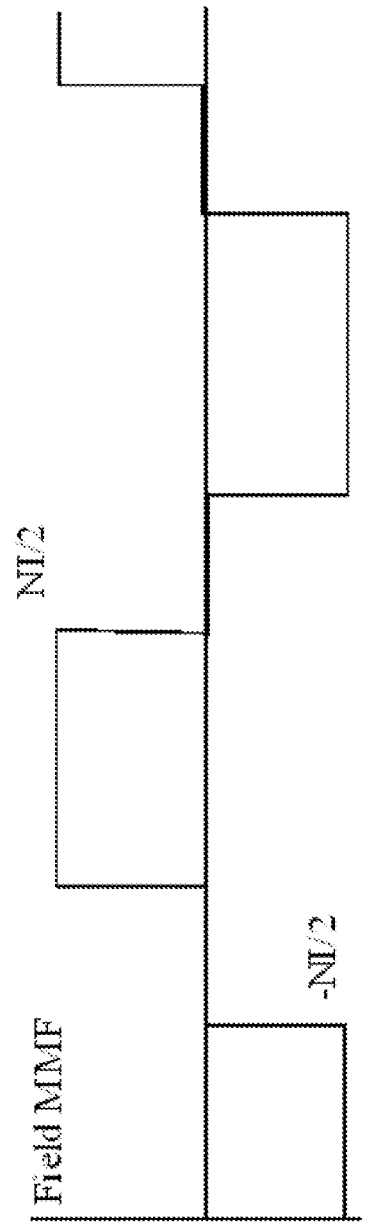

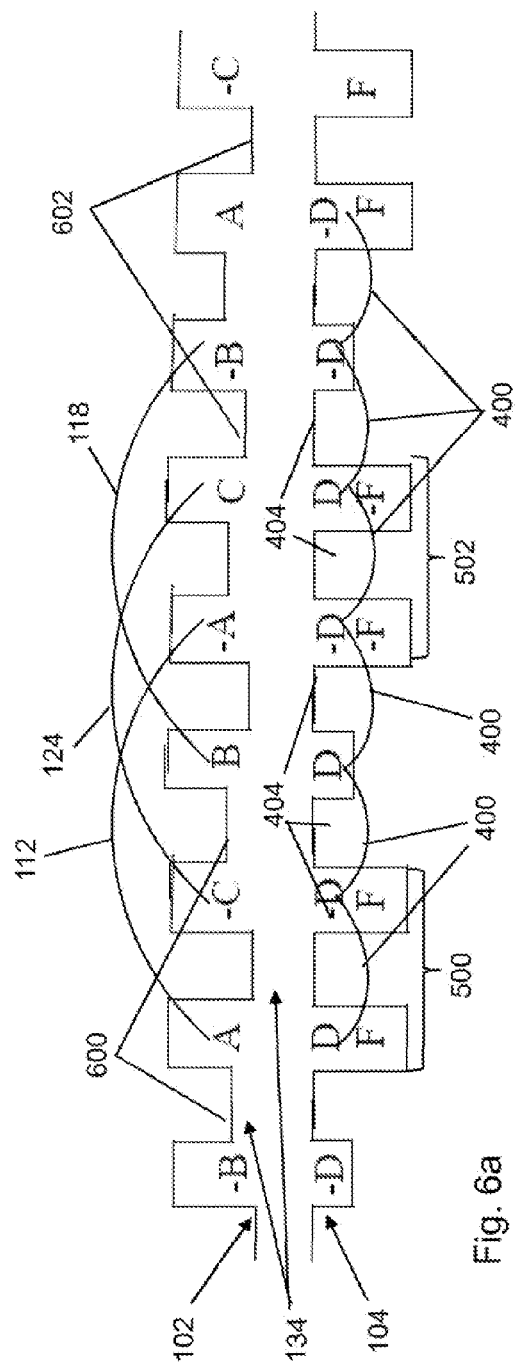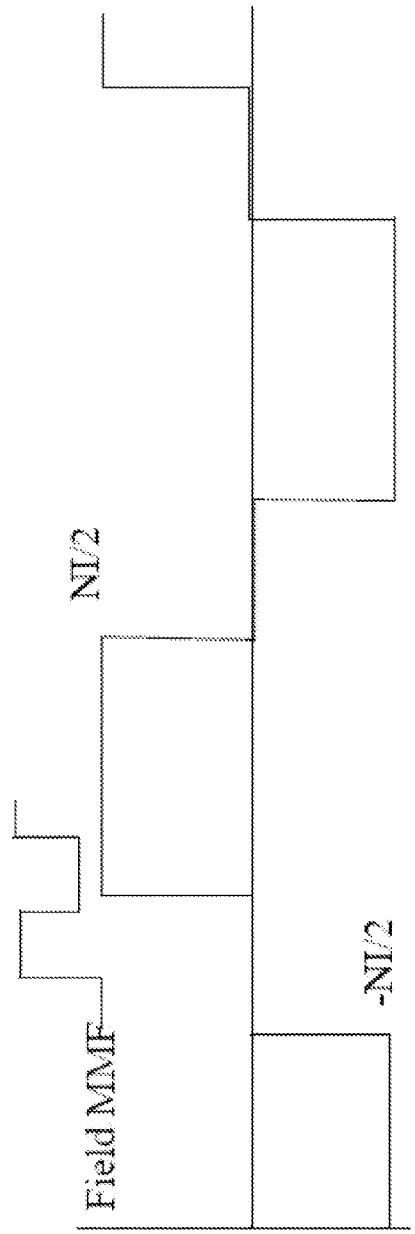
Fig. 6a
Fig. 6b

BRUSHLESS SYNCHRONOUS MACHINE UTILIZING THIRD HARMONIC EXCITATION

BACKGROUND

Existing electrical machines provide the ability to capture power from a mechanically rotating source, such as a wind turbine or deliver power to load such as a pump or compressor. A synchronous machine may therefore comprise a synchronous motor or a synchronous generator. As an example, a synchronous motor includes a stator, which carries an armature winding, and a rotor, which carries a field winding and which rotates at a supply frequency or a submultiple of the supply frequency. The armature winding is spatially distributed for poly-phase alternating current (AC), which creates a rotating magnetic field inside the synchronous motor. The magnetic field on the rotor is either generated by current delivered through slip rings and brushes to the field winding of the rotor or by a rotor comprised of a permanent magnet. On excitation through carbon brushes connected to slip rings on the rotor shaft, the field winding behaves as the equivalent of a permanent magnet. A drawback to synchronous machines utilizing brushes and slip rings is that the slip rings and brushes present reliability and maintenance issues because they are often a source of mechanical failure. Conversely, embodiments utilizing a permanent magnet are becoming increasingly expensive due to the scarcity of the raw materials used to form the permanent magnet.

SUMMARY

A brushless, synchronous motor is provided that includes a rotor, a stator extending around at least a portion of the rotor and separated from the rotor by an air gap, a first stator winding, a second stator winding, a third stator winding, a drive circuit, a first rotor winding, a second rotor winding, and a diode bridge. The first stator winding, the second stator winding, and the third stator winding are mounted to the stator to generate square waves. The drive circuit is configured to provide a current to the first stator winding, the second stator winding, and the third stator winding, wherein the current includes an alternating current (AC) component and a direct current (DC) component. The first rotor winding is mounted to the rotor to form a plurality of third harmonic coils. The second rotor winding is mounted to the rotor. The generated square waves induce a voltage in the first rotor winding that is applied to the second rotor winding to create a brushless, synchronous motor. The diode bridge is mounted to the rotor to rectify the voltage induced in the first rotor winding and to apply the resulting DC voltage to the second rotor winding.

A method of operating a brushless, synchronous motor is provided. A current is provided to a first stator winding, a second stator winding, and a third stator winding. The current includes an alternating current (AC) component and a direct current (DC) component. The first stator winding, the second stator winding, and the third stator winding are mounted to a stator. A first rotating magnetomotive force (MMF) is generated in an air gap between the stator and a rotor in response to the AC component. A second rotating MMF is generated in the air gap between the stator and the rotor in response to the DC component. A voltage is induced in a first rotor winding mounted to the rotor to form a plurality of third harmonic coils. The induced voltage is rectified using a rectifier. The rectified voltage is applied to a second rotor winding mounted to the rotor to cause rotation of the rotor.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 4a depicts a first layout diagram of stator and rotor windings in accordance with a first illustrative embodiment of the synchronous machine of FIG. 1.

FIG. 4b depicts a block diagram of a circuit represented by the first layout diagram of FIG. 4a.

FIG. 5a depicts a second layout diagram of stator and rotor windings in accordance with a second embodiment of the synchronous machine of FIG. 1.

FIG. 5b depicts a field magnetomotive force (MMF) generated using the stator and rotor windings represented by the second layout diagram of FIG. 5a.

FIG. 6a depicts a third layout diagram of stator and rotor windings in accordance with a third embodiment of the synchronous machine of FIG. 1.

FIG. 6b depicts a field MMF generated using the stator and rotor windings represented by the third layout diagram of FIG. 6a.

DETAILED DESCRIPTION

Figure 1:
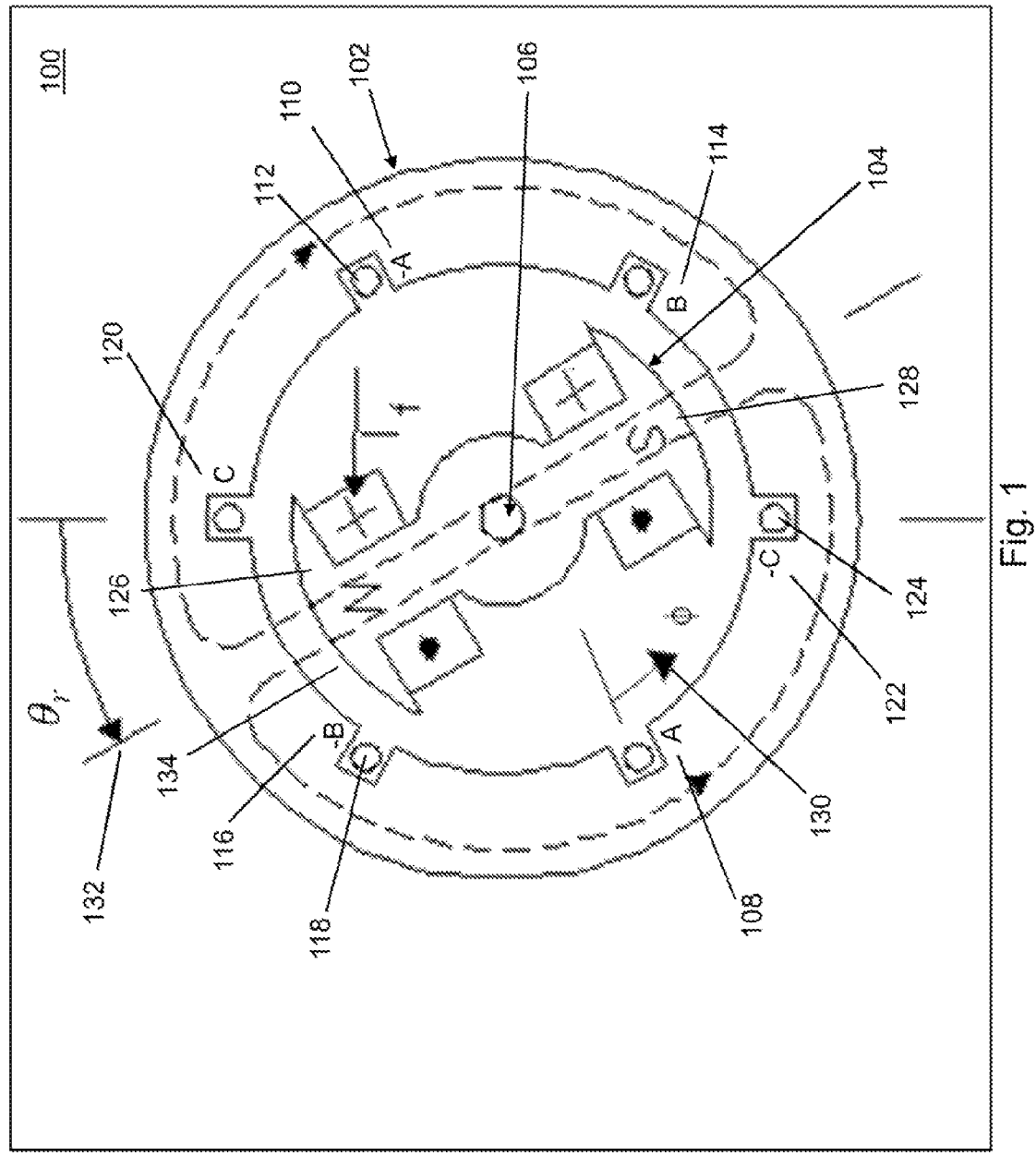
FIG. 1 depicts a cross-sectional view of a synchronous machine in accordance with an illustrative embodiment.

With reference to FIG. 1, a cross-sectional view of a machine 100 is shown in an illustrative embodiment. In general, machine 100 may be used as a motor or a generator dependent on the driving mechanism. Machine 100 may include a stator 102 and a rotor 104 mounted to a shaft 106 for rotation. Rotor 104 may be mounted to a shaft 106 through a variety of means as known to those skilled in the art. If machine 100 is utilized as a motor, stator 102 causes rotor 104 to rotate utilizing electrical energy thereby rotating shaft 106 to provide mechanical energy; whereas, if machine 100 is utilized as a generator, shaft 106 is rotated by an external mechanical force/torque that causes rotor 104 to rotate thereby causing stator 102 to generate electrical energy.

As shown with reference to the illustrative embodiment of FIG. 1, stator 102 includes six electromagnet, salient or projecting poles with each pair of poles having a concentrated, full pitch winding. For example, a first pair of poles 108, 110 have a first full pitch winding 112 and may be associated with a phase denoted as A; a second pair of poles 114, 116 have a second full pitch winding 118 and may be associated with a phase denoted as B; and a third pair of poles 120, 122 have a third full pitch winding 124 and may be associated with a phase denoted as C. Each stator pole may be positioned at 60° angular intervals and have a common arc length dimension. Stator 102 may have a greater or a fewer number of pairs of poles depending on the embodiment.

As shown with reference to the illustrative embodiment of FIG. 1, rotor 104 includes two salient or projecting poles 126, 128, which act as salient magnetic poles though rotor 104 may have a greater or a fewer number of poles and include poles having different dimensions depending on the embodiment. Each rotor pole may be positioned at equal angular intervals and have a common arc length dimension. Stator 102 and rotor 104 are separated by an air gap 134.

In a synchronous motor, application of three-phase AC power to stator 102 causes a rotating magnetic field to be setup around rotor 104. In a conventional machine, rotor 104 may be energized with a direct current (DC) through slip rings and brushes. The rotating magnetic field attracts the rotor field activated by the DC resulting in a turning force on shaft 106.

The magnetomotive force (MMF) produced in air gap 134 for motor 100 can be expressed by the winding function $$F(\emptyset, i) = \Sigma_{i=1}^{m} N_i(\emptyset) i_i(t) \quad (1)$$

where Ø 130 denotes the angular measure around air gap 134 of machine 100, $N_i(\emptyset)$ is the winding function describing the position and polarity of all of the coil sides of the winding of interest 112, 118, 124, and $i_i(t)$ is the current in the respective winding. The MMF for a three phase winding can therefore be expressed as $$F_{ABC}(\emptyset, i) = N_A(\emptyset) i_A(t) + N_B(\emptyset) i_B(t) + N_C(\emptyset) i_C(t). \quad (2)$$

In conventionally wound three phase armatures, the three currents are considered to be a balanced three phase set and the three winding functions are configured to approximate sinusoidal functions of the angle which are also balanced (mutually displaced by 120° with respect to Ø). The result can be shown to produce a constant amplitude uniformly rotating MMF along the air gap as known to a person of skill in the art.

If windings are instead configured to have a full pitch and concentrated layout as shown with reference to machine 100 of FIG. 1, the three winding functions of the three phases become rectangular waves. The three rectangular wave winding functions can be expressed as a Fourier series of odd harmonics. Assuming that only the first harmonic and the next most significant harmonic are retained in the series, the winding function for phases A, B, C can be represented as a function of the spatial angle ϕ as $$N_A(\emptyset) = \frac{4N}{\pi}\left(\sin\emptyset + \frac{1}{3}\sin 3\emptyset\right) \quad (3)$$

$$N_B(\emptyset) = \frac{4N}{\pi}\left(\sin\left(\emptyset - \frac{2\pi}{3}\right) + \frac{1}{3}\sin\left[3\left(\emptyset - \frac{2\pi}{3}\right)\right]\right) \quad (4)$$

$$= \frac{4N}{\pi}\left(\sin\left(\emptyset - \frac{2\pi}{3}\right) + \frac{1}{3}\sin 3\emptyset\right) \quad (5)$$

$$N_C(\emptyset) = \frac{4N}{\pi}\left(\sin\left(\emptyset + \frac{2\pi}{3}\right) + \frac{1}{3}\sin 3\emptyset\right) \quad (6)$$

A drive circuit generates three armature currents, $i_A(t)$, $i_B(t)$, $i_C(t)$, that are applied to first full pitch winding 112, second full pitch winding 118, and third full pitch winding 124, respectively, and have the form $$i_A(t) = I_1 \sin\omega t + I_n \quad (7)$$

$$i_B(t) = I_1 \sin\left(\omega t - \frac{2\pi}{3}\right) + I_n \quad (8)$$

$$i_C(t) = I_1 \sin\left(\omega t + \frac{2\pi}{3}\right) + I_n \quad (9)$$

Utilizing equation (2), the MMF becomes $$F_{ABC}(\emptyset, i) = \quad (10)$$
$$\frac{4N}{\pi}\left\{\left(\sin\emptyset + \frac{1}{3}\sin 3\emptyset\right)(I_1 \sin\omega t + I_n) + \sin\left(\emptyset - \frac{2\pi}{3}\right) + \frac{1}{3}\sin 3\emptyset\right)$$
$$\left(I_1 \sin\left(\omega t - \frac{2\pi}{3}\right) + I_n\right) +$$
$$\left(\sin\left(\emptyset + \frac{2\pi}{3}\right) + \frac{1}{3}\sin 3\emptyset\right)\left(I_1 \sin\left(\omega t + \frac{2\pi}{3}\right) + I_n\right)\right\}.$$

Rearranging equation (10), the MMF becomes $$F_{ABC}(\emptyset, i) = \frac{4}{\pi} N I_1 \left\{\sin\emptyset \sin\omega t + \right. \quad (11)$$
$$\sin\left(\emptyset - \frac{2\pi}{3}\right)\sin\left(\omega t - \frac{2\pi}{3}\right) + \sin\left(\emptyset + \frac{2\pi}{3}\right)\sin\left(\omega t + \frac{2\pi}{3}\right)\right\} +$$
$$\frac{4}{\pi} N I_1 \left\{\frac{1}{3}\sin 3\emptyset \left[\sin\omega t + \sin\left(\omega t - \frac{2\pi}{3}\right) + \sin\left(\omega t + \frac{2\pi}{3}\right)\right]\right\} +$$
$$\frac{4}{\pi}\frac{NI_n}{3}\left[\sin\emptyset + \sin\left(\emptyset - \frac{2\pi}{3}\right) + \sin\left(\emptyset + \frac{2\pi}{3}\right)\right] + \frac{4}{\pi}NI_n \sin 3\emptyset.$$

The first of the four terms produces a rotating constant amplitude uniformly rotating vector corresponding to the fundamental component of the current $I_1$. The second and third terms are zero because the sum of three balanced sine waves is zero. The fourth term is an additional term which is defined here as $$F_n = \frac{4}{\pi} N I_n \sin 3\emptyset. \quad (12)$$

As a result, neglecting harmonics higher than the third, first full pitch winding 112, second full pitch winding 118, and third full pitch winding 124, or the armature windings, produce two components of MMF that are decoupled from each other, a first MMF being the normal, constant amplitude, uniformly rotating MMF and a second MMF defined by equation (12), which is stationary in space. Of note, the "zero sequence" component or second MMF term, which normally is considered to involve only the third harmonic component with respect to time, can be a pulsating component the frequency of which is arbitrary and includes zero (DC).

If the second MMF term involves only a DC component $I_0$, the additional stator component of stator MMF appears in the reference frame of rotor 104 as $$F_o = \frac{4}{\pi} NI_o \sin 3\theta_r \qquad (13)$$

where $\theta_r$ 132 is the angle of rotor rotation with respect to a defined stator reference point as shown in FIG. 1.

Assuming synchronous speed, i.e. $\theta_r = \omega t$, as a result, at any spatial position around the air gap $\phi$, the rotor 104 experiences a sinusoidal constant amplitude MMF waveform.

Figure 2:
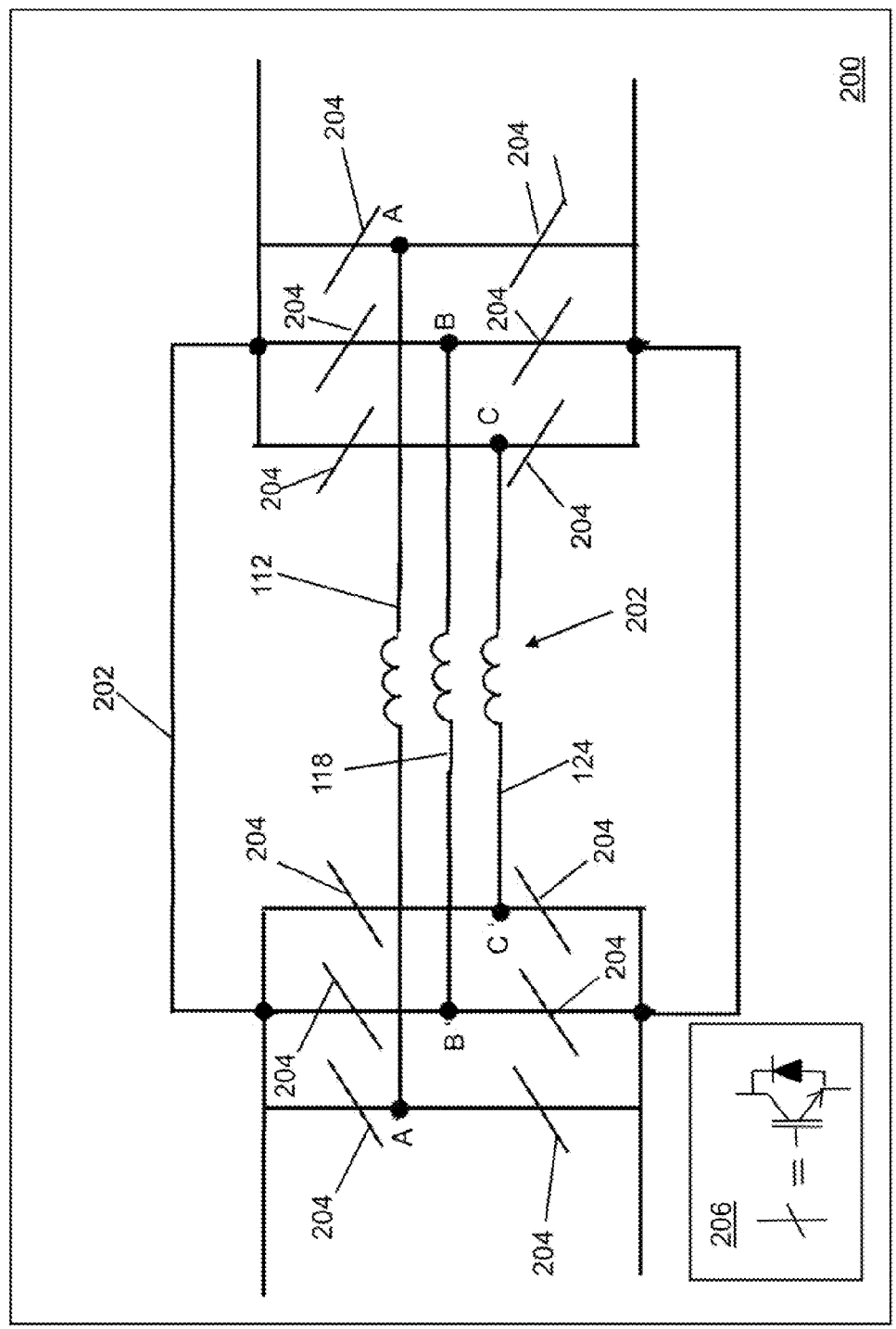
FIG. 2 depicts a diagram of a first stator circuit configured to generate a third harmonic component in accordance with a first illustrative embodiment.

With reference to FIG. 2, a first stator circuit 200 including an open winding connection 202 is shown in accordance with an illustrative embodiment. Using an open winding connection 202, a first added pulsating or single phase component of current, $I_n$, can be created by controlling operation of switches 204 across each phase A, B, C as known to a person of skill in the art. In an illustrative embodiment, each switch of the switches 204 may include a switch circuit 206 as shown with reference to FIG. 2.

Figure 3:
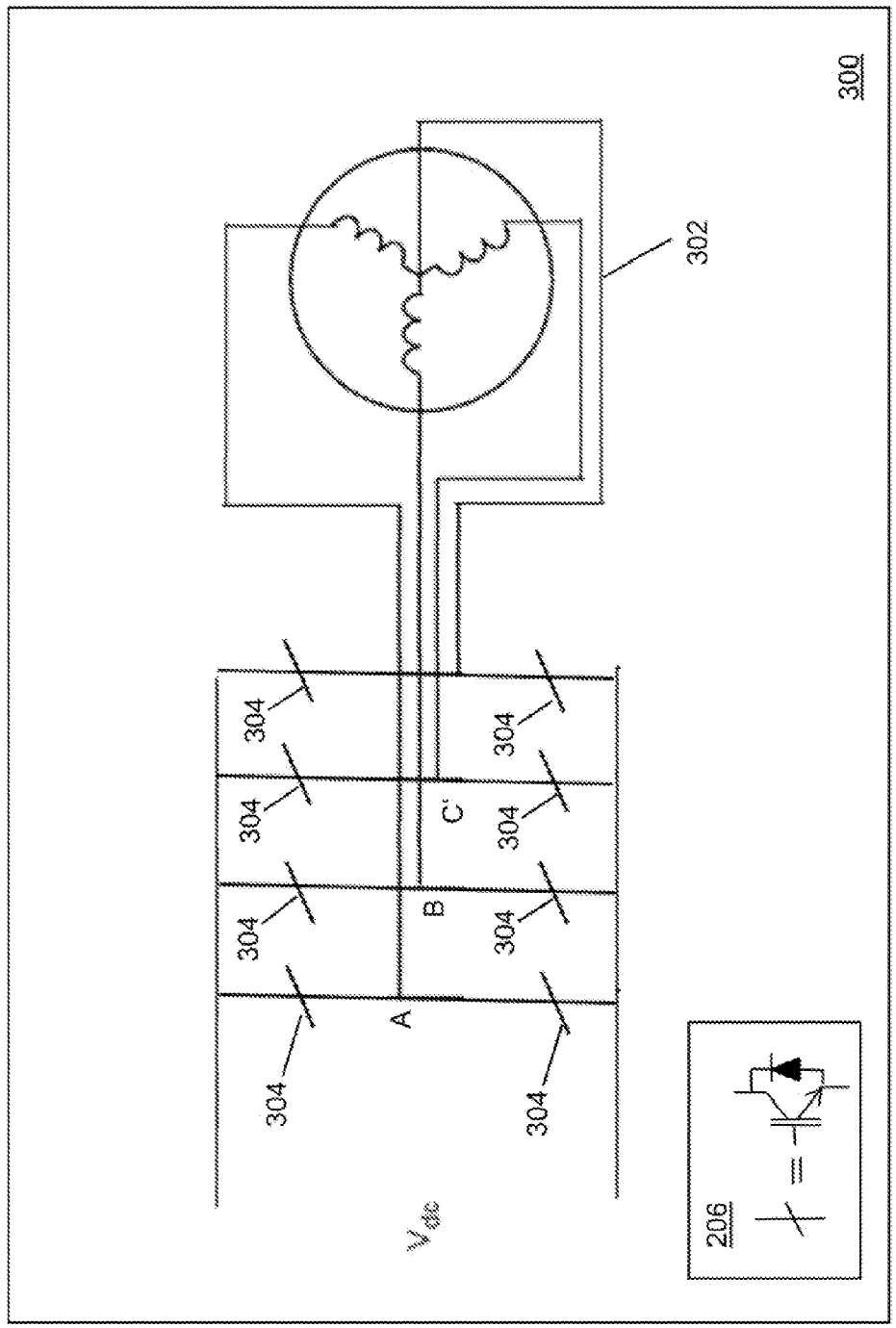
FIG. 3 depicts a diagram of a second stator circuit configured to generate a third harmonic component in accordance with a second illustrative embodiment.

With reference to FIG. 3, a second stator circuit 300 including a fourth inverter leg 302 is shown in accordance with an illustrative embodiment. Using the fourth inverter leg 302, a DC component of current, $I_0$, can be created by controlling operation of switches 304 across each phase A, B, C as known to a person of skill in the art. In an illustrative embodiment, each switch of the switches 304 may include a switch circuit 206 as shown with reference to FIG. 3.

With reference to FIGS. 4a and 4b, a layout of stator and rotor windings for machine 100 and a diagram of a circuit representation for the stator and rotor windings for machine 100, respectively, are shown to illustrate a principle of operation of machine 100 in accordance with an illustrative embodiment. A pulsating MMF as viewed from rotor 104 can be utilized by installing a first rotor winding 400 having a third harmonic spatial component in a first slot 402 and in a second plurality of slots 404. The voltage induced in first rotor winding 400 can be rectified using a rectifier 406, and the resulting voltage applied to a second rotor winding 408 having a full pitch in first slot 402 creating the equivalent of a DC field winding without the use of brushes or slip rings. In an illustrative embodiment, rectifier 406 is a diode bridge.

Because the zero sequence stator current creating the DC field current is DC, no inductive drop in stator 102 occurs to limit the field current that can be induced. Also, the current on the DC side of rectifier 406 is limited only by a very small resistance drop. Therefore, the maximum field current is set essentially by the reactive drop across first rotor winding 400. The current on the DC side of rectifier 406 (i.e. the field current) is proportional to the current on the AC side (i.e. the spatial third harmonic current). However, since the MMF created by the field winding is the product of the field turns times the DC current, multiple field turns can be utilized to produce whatever field MMF is desired. The limit is determined by both the reactive drop of the AC side and the resistance of the DC field winding.

With reference to FIG. 5a, a layout of stator and rotor windings for machine 100 is shown in accordance with an illustrative embodiment utilizing a cylindrical rotor configuration. It is preferred that the field winding not create any third harmonic spatial components which could interfere with utilization of the third harmonic spatial component creating the excitation of rotor 104. As shown with reference to FIG. 5a, sides of a field winding coil are placed in adjacent slots 500, 502 displaced by 60 electrical degrees producing an MMF distribution, which does not contain a third spatial harmonic, as shown with reference to FIG. 5b.

With reference to FIG. 6a, a layout of stator and rotor windings for machine 100 is shown in accordance with an illustrative embodiment utilizing a cylindrical rotor configuration. In the illustrative embodiment of FIG. 6a, stator 102 includes a first plurality of saliencies 600 and a second plurality of saliencies 602 creating variations in air gap 134 which create a third harmonic saliency. Using this illustrative embodiment, a conventional three leg inverter can be used instead of the circuits shown with reference to FIGS. 2 and 3. However, if desired, the circuits shown with reference to FIGS. 2 and 3 can be used together with machine 100 shown with reference to FIG. 6a. The DC current component added to the stator MMF can be used to add or subtract from the MMF provided by the saliencies to achieve the function of an adjustable field winding. With reference to FIG. 6b, the resulting field MMF is shown.

Figure 7:
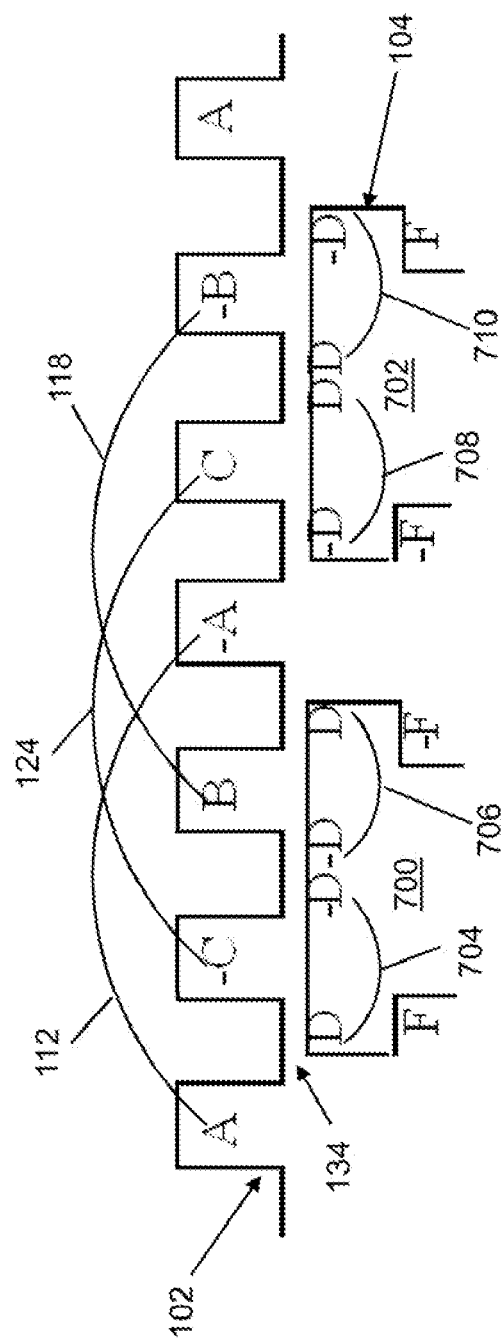
FIG. 7 depicts a fourth layout diagram of stator and rotor windings in accordance with a fourth embodiment of the synchronous machine of FIG. 1.

With reference to FIG. 7, a layout of stator and rotor windings for machine 100 is shown in accordance with an illustrative embodiment utilizing rotor 104 having a salient pole configuration including a first saliency 700 and a second saliency 702 First saliency 700 includes a first third harmonic coil 704 and a second third harmonic coil 706. Second saliency 702 includes a first third harmonic coil 708 and a second third harmonic coil 710. Therefore, only two third harmonic coils are utilized per pole rather than three. Again, no third harmonics are created in air gap 134 as a result of the field winding.

Figure 8:
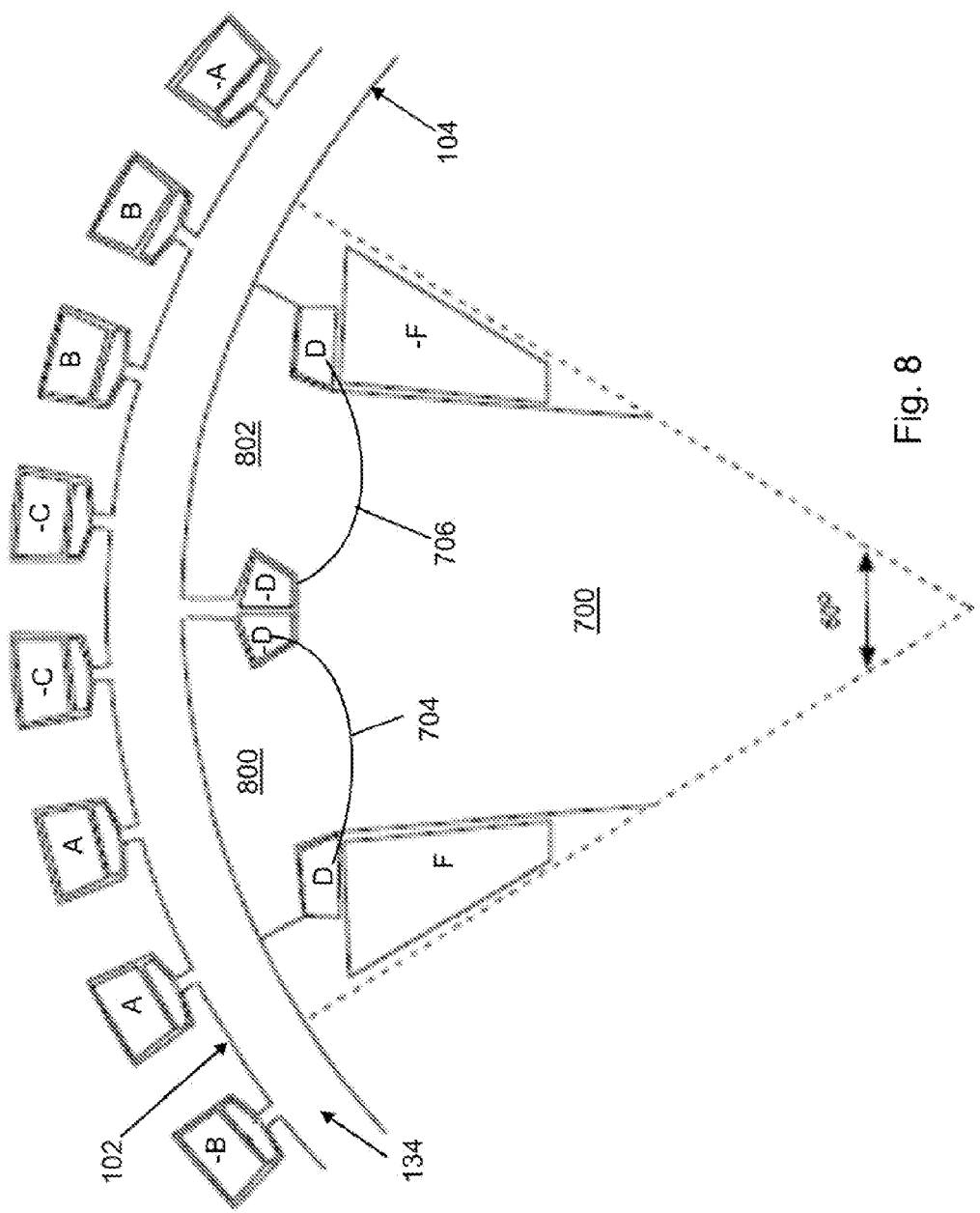
FIG. 8 depicts a pole geometry based on the fourth layout diagram of stator and rotor windings of FIG. 7 in accordance with an illustrative embodiment.

With reference to FIG. 8, a pole geometry for machine 100 of FIG. 7 is shown in accordance with a more illustrative actual embodiment where first saliency 700 includes a first projection 800 and a second projection 802 such that first third harmonic coil 704 of first saliency 700 is wound around first projection 800 and second third harmonic coil 706 of first salience 700 is wound around second projection 802.

Figure 9:
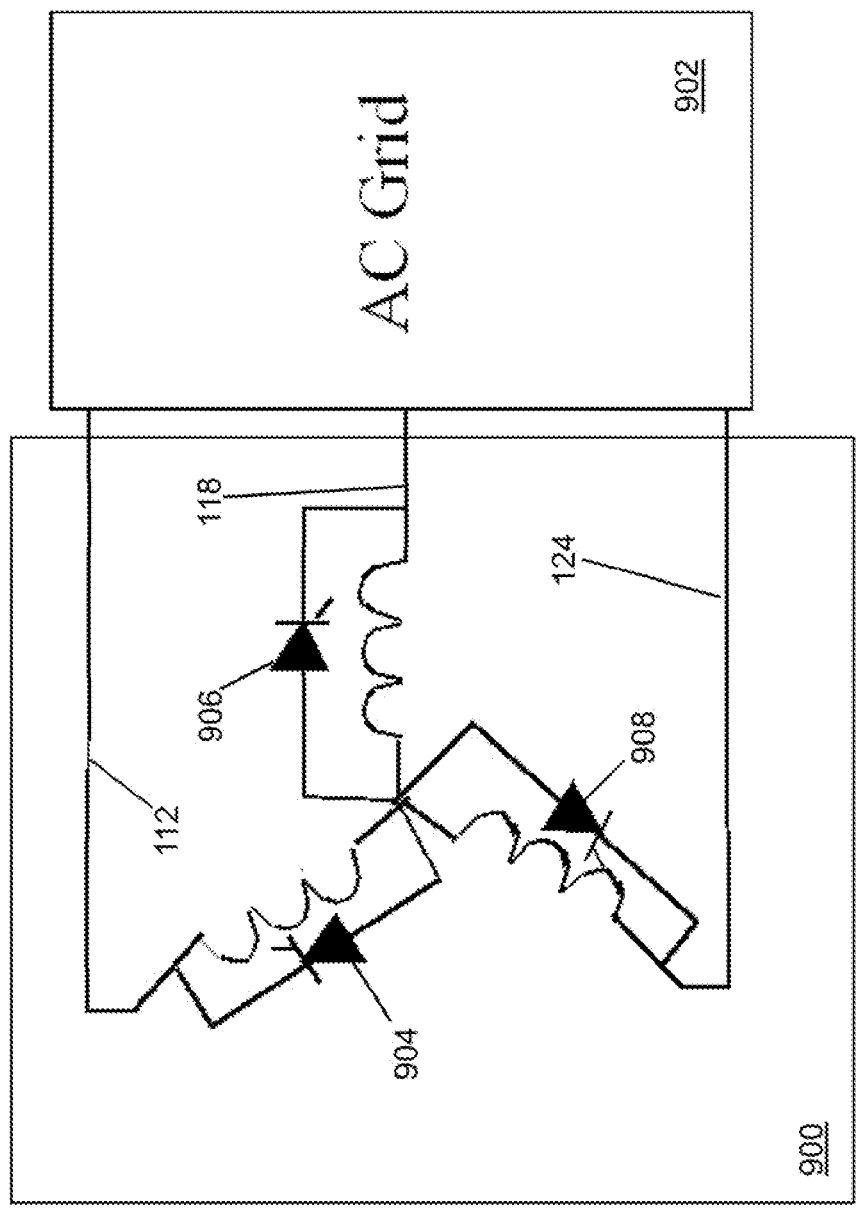
FIG. 9 depicts an implementation of the synchronous machine of FIG. 4a for operation as an isolated power source in accordance with an illustrative embodiment.

The brushless concept can be expanded to include operation as a generator 900 providing power to an AC grid 902 or other load. Generator 900 may provide a constant 60 Hz power to AC grid 902. The added DC current component in the stator can be implemented using three silicon controlled rectifiers (SCRs) 904, 906, 908 as shown with reference to FIG. 9. SCRs 904, 906, 908 are controlled to produce the desired component of DC current in first full pitch winding 112, second full pitch winding 118, and third full pitch winding 124, respectively. However, additional harmonics are produced when using simple phase control. Nonetheless, generator 900 can be used where the quality of the voltage waveform is not critical such as in isolated power supplies.

A disadvantage of a synchronous motor using this concept is that it cannot be started from a standstill by applying a component of DC power to stator 102. However, this problem can be overcome by first utilizing an AC component for the zero sequence current rather than a DC one. For example, if a third time harmonic component is chosen, the MMF impressed on rotor 104 is $$F_n = \frac{4}{\pi} NI_3$$

sin $3\omega t$ sin $3(\emptyset - \theta r)$, where $\theta r \cong 0$. The MMF at zero speed is then simply a third time harmonic. When the rotor speed begins to increase, frequencies $3(\omega t - \theta_r)$ and $3(\omega t + \theta_r)$ appear causing the amplitude to slowly pulsate. Because the third time harmonic now induces a voltage in the first rotor winding the motor can be started. A pulsating component however, produces noise and torque pulsations. Before the pulsating effect becomes pronounced, the pulsating or single phase component of current, $I_n$, can be switched to a DC value through control of the power converter.

Figure 10:
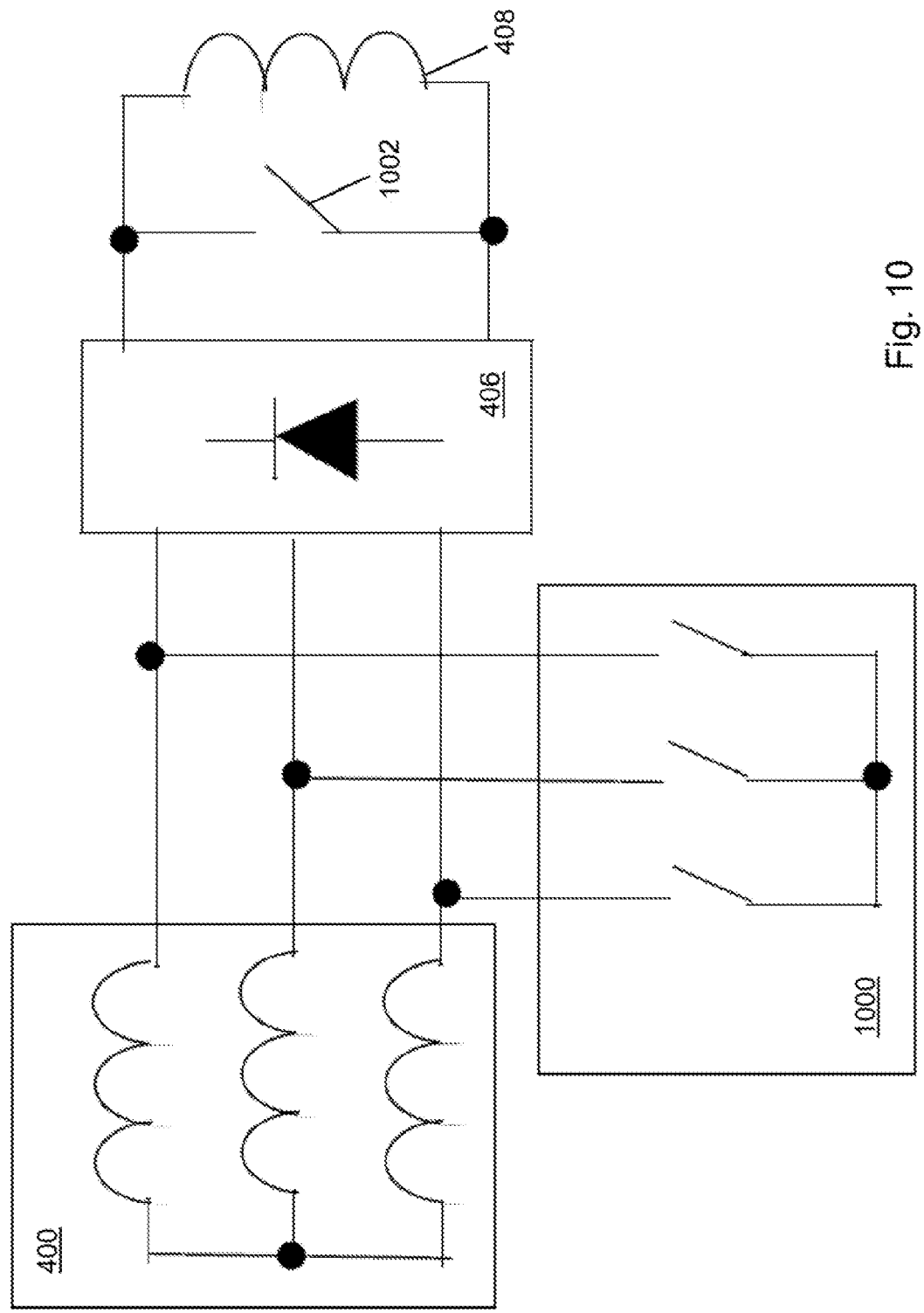
FIG. 10 depicts a control algorithm for starting the synchronous machine of FIG. 1 when operated as a motor fed from a sinusoidal power supply in accordance with an illustrative embodiment.

An important application area for the use of machine 100 is as a motor fed from a sinusoidal power source. However, this case requires a more sophisticated control algorithm in order to start machine 100. In this case, the best choice for the neutral current, $I_n$, is the use of a single phase current. Since induced rotor current must flow to produce induction motor type starting torque, the rotor circuits may be short circuited by switches 1000 as shown with reference to FIG. 10. Switches 1000 are activated upon starting and are opened when rotor 104 approaches synchronous speed. A centrifugal switch 1002 may be used if centrifugal switch 1002 can be reliably opened at the correct instant. The alternative is to use a controlled switch, opened by sensing a frequency of the stator slots or the frequency induced in the third harmonic rotor windings as rotor 104 reaches synchronous speed. In an illustrative embodiment, the stator and rotor winding configuration is the same as shown with reference to FIG. 4*a*.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A motor comprising:
a rotor;
a stator extending around at least a portion of the rotor and separated from the rotor by an air gap;
a first stator winding;
a second stator winding;
a third stator winding, wherein the first stator winding, the second stator winding, and the third stator winding are mounted to the stator to generate square waves;
a drive circuit configured to provide a current to the first stator winding, the second stator winding, and the third stator winding, wherein the current includes an alternating current (AC) component and a direct current (DC) component;
a first rotor winding mounted to the rotor to form a plurality of third harmonic coils;
a second rotor winding mounted to the rotor, wherein, when generated, the generated square waves induce a voltage in the first rotor winding that is applied to the second rotor winding; and
a diode bridge mounted to the rotor to rectify the voltage induced in the first rotor winding and to apply the resulting DC voltage to the second rotor winding.

2. The motor of claim 1, wherein the first stator winding, the second stator winding, and the third stator winding are mounted to the stator to form concentrated, full pitch windings that generate the square waves.

3. The motor of claim 1, wherein the DC component is generated using an open winding connection.

4. The motor of claim 1, wherein the DC component is generated using a fourth inverter leg.

5. The motor of claim 1, wherein a width of the air gap between the rotor and the stator adjacent each pole changes.

6. The motor of claim 1, wherein the rotor comprises a cylindrical rotor and the second rotor winding is mounted in adjacent slots displaced by 60 electrical degrees.

7. The motor of claim 6, wherein the first rotor winding includes three third harmonic coils for each pole.

8. The motor of claim 1, wherein the rotor comprises a salient pole structure and the first rotor winding includes two third harmonic coils for each pole.

9. The motor of claim 1, wherein the drive circuit is further configured to provide a first current to the first stator winding, the second stator winding, and the third stator winding to start the motor, wherein the first current includes the AC component and a third harmonic of the AC component, wherein the third harmonic of the AC component is switched to the DC component based on a rotation speed of the rotor.

10. A method of operating a brushless, synchronous motor, the method comprising:
providing a current to a first stator winding, a second stator winding, and a third stator winding, wherein the current includes an alternating current (AC) component and a direct current (DC) component, wherein the first stator winding, the second stator winding, and the third stator winding are mounted to a stator;
generating a first rotating magnetomotive force (MMF) in an air gap between the stator and a rotor in response to the AC component;
generating a second rotating MMF in the air gap between the stator and the rotor in response to the DC component; and
inducing a voltage in a first rotor winding mounted to the rotor to form a plurality of third harmonic coils;
rectifying the induced voltage using a rectifier; and
applying the rectified voltage to a second rotor winding mounted to the rotor to cause rotation of the rotor.

11. The method of claim 10, wherein the first stator winding, the second stator winding, and the third stator winding are mounted to the stator to form concentrated, full pitch windings that generate the first rotating MMF and the second rotating MMF.

12. The method of claim 10, wherein the DC component is generated using an open winding connection.

13. The method of claim 10, wherein the DC component is generated using a fourth inverter leg.

14. The method of claim 10, wherein the air gap between the rotor and the stator adjacent each pole changes to create the DC component.

15. The method of claim 10, wherein the rotor comprises a cylindrical rotor and the second rotor winding is mounted in adjacent slots displaced by 60 electrical degrees.

16. The method of claim 15, wherein the first rotor winding includes three third harmonic coils for each pole.

17. The method of claim 10, wherein the rotor comprises a salient pole structure and the first rotor winding includes two third harmonic coils for each pole.

18. The method of claim 10, further comprising, before providing the current to a first stator winding, a second stator winding, and a third stator winding, providing a first current to the first stator winding, the second stator winding, and the third stator winding to start the motor, wherein the first current includes the AC component and a third harmonic of the AC component; and switching to the DC component based on a rotation speed of the rotor.

* * * * *